United States Patent [19]

Kalotay

[11] Patent Number: 5,321,991

[45] Date of Patent: Jun. 21, 1994

[54] CORIOLIS EFFECT MASS FLOWMETER

[75] Inventor: Paul Z. Kalotay, Lafayette, Colo.

[73] Assignee: Micro Motion Incorporated, Boulder, Colo.

[21] Appl. No.: 66,905

[22] Filed: May 25, 1993

Related U.S. Application Data

[63] Continuation-in-part of Ser. No. 739,347, Aug. 1, 1991, abandoned.

[51] Int. Cl.$^5$ .............................................. G01F 1/84
[52] U.S. Cl. .................................................. 73/861.37
[58] Field of Search ........................ 73/861.37, 861.38

[56] References Cited

U.S. PATENT DOCUMENTS

| Re. 31,450 | 11/1983 | Smith | 73/861.38 |
|---|---|---|---|
| 3,329,019 | 7/1967 | Sipin | 73/194 |
| 4,109,524 | 8/1978 | Smith | 73/194 |
| 4,286,470 | 9/1981 | Lynnworth | 73/861.18 |
| 4,491,025 | 1/1985 | Smith et al. | 73/861.38 |
| 4,622,858 | 11/1986 | Mizerak | 73/861.38 |
| 4,658,657 | 4/1987 | Küppers | 73/861.38 |
| 4,680,974 | 7/1987 | Simonsen et al. | 73/861.38 |
| 4,691,578 | 9/1987 | Herzl | 73/861.38 |
| 4,703,660 | 11/1987 | Brenneman | 73/861.38 |
| 4,756,197 | 7/1988 | Herzl | 73/861.38 |
| 4,823,613 | 4/1989 | Cage et al. | 73/861.38 |
| 4,823,614 | 4/1989 | Dahlin | 73/861.38 |
| 4,831,885 | 5/1989 | Dahlin | 73/861.38 |
| 4,938,075 | 7/1990 | Lew | 73/861.38 |
| 4,949,583 | 8/1990 | Lang et al. | 73/861.37 |
| 5,009,109 | 4/1991 | Kalotay et al. | 73/861.38 |
| 5,115,683 | 5/1992 | Pratt | 73/861.38 |

FOREIGN PATENT DOCUMENTS

| 0253504 | 6/1987 | European Pat. Off. . |
|---|---|---|
| 0282217 | 1/1988 | European Pat. Off. . |
| 0316908 | 11/1988 | European Pat. Off. . |
| 0375300 | 12/1989 | European Pat. Off. . |
| 0493825 | 12/1991 | European Pat. Off. . |
| 8607340 | 5/1986 | France . |
| 58-206926 | 4/1982 | Japan . |
| 57-137818 | 8/1982 | Japan . |
| 58-153121 | 9/1983 | Japan . |
| 401908 | 12/1970 | U.S.S.R. . |
| 427269 | 5/1972 | U.S.S.R. . |
| 920383 | 11/1979 | U.S.S.R. . |
| 1008617 | 2/1980 | U.S.S.R. . |
| 1283614 | 2/1985 | U.S.S.R. . |

OTHER PUBLICATIONS

Langdon "Resonator Sensors–A Review" in J. Phys E. Scientific Instrument vol. 18 1985 pp. 107-111.
Wildhack, "Review of some Methods of Flow Measurement" in Science Aug. 1954.
K-Flow Brochure "Mass Flow Meters" Oct. 1986.
Cascetta, et al., "A new straight-pipe Coriolis mass flowmeter: the mathematical model" Jul./Sep. 1991, Measurement vol. 9, No. 3, pp. 115.

Primary Examiner—Herbert Goldstein
Attorney, Agent, or Firm—Duft, Graziano & Forest

[57] ABSTRACT

A Coriolis effect mass flowmeter for measuring mass material flow in a conduit. Elements of the meter are clamped directly onto an existing pipe or other conduit without diversion of the flow. The meter comprises a driver, such as a magnetostrictive driver, to oscillate a section of pipe between two supports. The driver is mounted on the pipe section at or near an anti-node of the second harmonic mode of the natural frequency of the pipe section. A sensor, such as an accelerometer, is mounted onto the pipe section at the node point of the second harmonic mode of the natural frequency of the pipe section during zero flow, (zero flow node point). The second sensor measures the amplitude of displacement of the zero flow node point due to the Coriolis effect forces from the mass of the material flowing through the oscillating pipe. This measurement is indicative of the mass flow rate of the material flowing through the pipe. The meter is not dependent upon phase shift detection and is not susceptible to extraneous noise and does not require a complicated mounting. In one alternative embodiment, the meter is prefabricated on a section of pipe which can then be installed in a pipeline as an off the shelf item. In another alternative embodiment, a pair of sensors is affixed to different locations of the pipe section to generate phase or time separated signals. The signals are applied to processing circuitry that determines mass flow rate information from the phase or time separated signals.

28 Claims, 7 Drawing Sheets

CORIOLIS EFFECT MASS FLOWMETER

RELATED APPLICATION

This patent application is filed as a continuation-in-part of copending patent application, bearing Ser. No. 07/739,347, and filed in the United States Patent and Trademark Office on Aug. 1, 1991 now abandoned.

BACKGROUND OF THE INVENTION

The present invention relates to Coriolis effect flowmeters for measuring mass fluid flow in a tube or pipe. It further relates to the provision of flowmeter devices that are affixed to a segment of an existing tube or pipe system to operate the segment as a Coriolis flowmeter.

STATEMENT OF THE PROBLEM

Coriolis flowmeters directly measure the rate of mass flow through a conduit. As disclosed in the art, such as in U.S. Pat. No. 4,491,025 (issued to J. E. Smith et al. on Jan. 1, 1985, and hereinafter referred to as the U.S. Pat. No. 4,491,025) and U.S. Pat. No. Re. 31,450 (issued to J. E. Smith on Feb. 11, 1982, and hereinafter referred to as the U.S. Pat. No. Re. 31,450), these flowmeters have one or more flow tubes of straight or curved configuration. Each flow tube configuration in a Coriolis mass flowmeter has a set of natural vibration modes, which may be of a simple bending, torsional or coupled type. Fluid flows into the flowmeter from the adjacent pipeline on the inlet side, is directed to the flow tube or tubes, and exits the flowmeter through the outlet side of the flowmeter. The natural vibration modes of the vibrating, fluid system are defined in part by the combined mass of the flow tubes and the fluid within the flow tubes. Each flow conduit is driven to oscillate at resonance in one of these natural modes.

When there is no flow through the flowmeter, all points along the flow tube oscillate with identical phase. As fluid begins to flow, Coriolis accelerations cause each point along the flow tube to have a different phase. The phase on the inlet side of the flow tube lags the driver, while the phase on the outlet side leads the driver. Sensors can be placed on the flow tube to produce sinusoidal signals representative of the motion of the flow tube. The phase difference between two sensor signals is proportional to the mass flow rate of fluid through the flow tube. A complicating factor in this measurement is that the density of typical process fluids varies. Changes in density cause the frequencies of the natural modes to vary. Since the flowmeter's control system maintains resonance, the oscillation frequency varies in response. Mass flow rate in this situation is proportional to the ratio of phase difference and oscillation frequency.

U.S. Pat. No. Re. 31,450 discloses a Coriolis flowmeter that avoided the need of measuring both phase difference and oscillation frequency. Phase difference is determined by measuring the time delay between level crossings of the two sinusoidal signals. When this method is used, the varitions in the oscillation frequency cancel, and mass flow rate is proportional to the measured time delay. This measurement method is hereinafter referred to as a phase or time delay measurement.

Prior art flowmeters have a number of disadvantages. They all require a diversion of the material flow into specially provided meter flow tubes. This creates a pressure drop and reduces the volume of material flow through the pipe system of which the meter is a part. Many prior art flowmeters are dependent on phase shift measurements of the oscillation or twisting of the flow tubes. This normally requires isolation of the flow tubes from outside vibrations. The use of double tubes increases accuracy by reducing errors from the outside vibrations. Mounting the tubes on exterior support structures can itself cause vibration and noise to be transmitted through to the tubes, such as on a ship or other vibrating structure.

A need exists for a flowmeter that measures the mass flow rate of material within a pipe or other conduit with only a minimal modification of the pipe or conduit being required to accommodate the meter. There is also a need for the provision of a meter that will not create additional pressure drops within the pipe or reduce the flow of measured material and that is not highly susceptible to extraneous noise and vibration.

SUMMARY OF THE INVENTION

The present invention provides an improved method of and apparatus for measuring the mass flow rate of materials through a pipe or conduit. The provided apparatus measures the mass flow rate by measuring the Coriolis force effects of the flowing material undergoing oscillation. The driver and sensor means comprising the Coriolis flowmeter of the invention are clamped, when in use, directly onto an existing pipe section integral with an existing pipe system. The driver and sensor means contact only the existing pipe section and are free from attachment to any external non-moveable structure such as a frame, wall, column, or any other such support structure. This permits an existing conduit or pipe system to be retrofitted and installed with mass flow measurement facilities with a minimum of modification by merely clamping the necessary driver and sensors to a section of the existing pipe system. The driver and sensor means are then connected to suitable electronics which supply an energizing signal to the driver to oscillate the pipe section and which receive the output signal of the sensor means to generate the desired mass flow rate information. The use of clamp-on driver and sensor means minimizes the need for structural modification of the existing pipe system by eliminating the need for installation of external supports and other non-moveable structure to support the driver and sensor means.

The meter of the present invention uses a driver, for instance a magnetostrictive driver, that oscillates a section of pipe at a harmonic frequency, such as the second harmonic, of the pipe section's natural frequency. This driver is clamped onto the pipe at or near an anti-node of the second harmonic of the natural frequency or at any other location except a node of the second harmonic of the natural frequency. No external supports are used in mounting the driver, which is controlled through a feedback circuit, to maintain the desired frequency and amplitude of oscillation. In a first embodiment of the invention, a motion sensor, such as an accelerometer, is mounted near the driver and comprises part of a feedback circuit for controlling the driver. Another motion sensor, preferably an accelerometer, is mounted at a location comprising a zero flow node of the second harmonic of the natural frequency of the vibration of the pipe section. This node is hereinafter referred to as the "zero flow node". No external structure is required in mounting this sensor to the pipe section.

The Coriolis forces resulting from material flowing through the oscillating pipe section cause the zero flow node to be displaced cyclically in a direction perpendicular to the direction of material flow. The vector component of angular velocity of the material flowing through the pipe creates forces against the wall of the pipe. These forces displace the position of the zero flow node location of the pipe in a direction transversely to the location of the node without any material flow. Since the pipe achieves two extreme positions during each Coriolis vibration cycle, one driven and one non-driven, the zero flow node pipe location shifts transversely during each Coriolis cycle. The sensor mounted at the zero flow node translates this transverse cyclical displacement into a position, velocity or acceleration signal proportional to mass flow rate. From this cyclical transverse displacement, a measurement of the mass flow rate of the material through the vibrating pipe can be derived.

In accordance with a second embodiment of the invention, a pair of accelerometers operating as motion sensors are clamped to different locations of the pipe in order to generate output information useful in deriving mass flow information. These two sensors generate signals which are displaced from one another in time or phase with this phase or time difference being used to generate the mass flow information. The phase on the inlet side of the pipe lags the driver while the phase on the outlet side of the pipe leads the driver. The sensors placed at different locations produce sinusoidal signals representative of the motion of the pipe with material flowing therethrough. The phase difference between the two sensor signals is proportional to the mass flow rate of fluid through the pipe.

The flowmeter of the present invention can be used either on substantially straight or on curved pipes. The present invention also provides, if desired, additional sensors to detect and cancel extraneous noise to provide higher accuracy of measurement.

These and other features of the present invention are evident from the ensuing description of possible exemplary preferred embodiments taken in conjunction with the drawings.

DETAILED DESCRIPTION OF A PREFERRED EMBODIMENT

The present invention provides apparatus comprising and a method of operating a mass flowmeter for measuring the mass flow rates of material through a conduit, such as a pipe or tube. The provided mass flowmeter can be mounted onto existing pipes without diverting or restricting the material flow or requiring complicated mounting procedures. Alternatively, the flowmeter of the present invention can be fabricated as a unit to be installed into an existing pipe system. The flowmeter of the invention is operable on various sizes and shapes of pipes and in most operating conditions. The conduits with which the flowmeter is utilized are herein referred to as pipes. However, the present invention is not meant to be limited to this description. Other types of closed conduits, such as tubes and the like, are within the claimed inventive concept.

Figure 1:
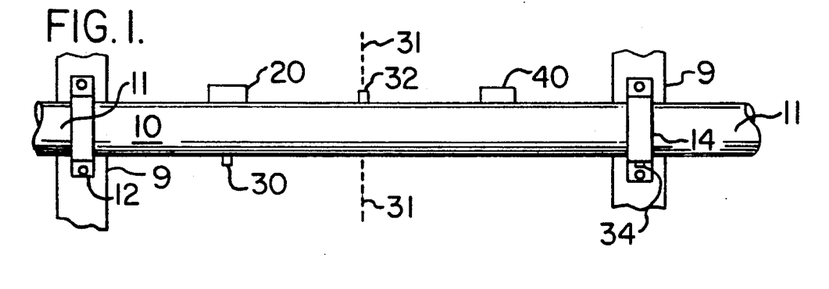
FIG. 1 shows a schematic representation of one possible exemplary preferred embodiment of the present invention.

One possible exemplary preferred embodiment of the present invention is illustrated in FIG. 1. It is to be expressly understood that this descriptive embodiment is for explanatory purposes only and is not meant to limit the scope of the claimed inventive concept. Other embodiments are considered to be within the scope of the present invention.

The disclosed meter is affixed to tubes or pipes which are capable of withstanding the stresses generated by the combined effects of the vibration and the Coriolis forces. Such materials are well known in the art.

Overview of the System

A section of pipe 10 on FIG. 1, comprising a part of an existing pipe system 11, is supported by elements 12, 14. The distance between these elements determines the frequency at which pipe 10 vibrates since the distance is one wave length of the material frequency of vibration. Elements 12 and 14 are only required when the length of pipe section 10 would otherwise be too long for the flowmeter to vibrate at a suitable frequency. Supports 12, 14 can be pre-existing or they may be unnecessary if pipe 10 vibrates at a suitable frequency without such supports. Supports 12, 14 may be affixed by bolts to rigid vertical members 9. The flowmeter elements of the present invention are clamped onto pipe 10 without any modifications or alternations to the pipe being required to measure the mass flow rate of the material being transported within the pipe. Pipe 10 is shown as a substantially straight tube of constant cross-section. It is to be understood that the flowmeter of the present invention is usable on various shapes and configurations of pipes.

The flowmeter of FIG. 1 includes driver 20 which is clamped directly onto pipe 10 at or near an anti-node of the second harmonic of the natural frequency or at any other location except a node of the second harmonic of the natural frequency. Additional drivers, similar to driver 20 can also be clamped onto pipe 10 to add symmetry or to equalize the loading on the pipe. However, the system of the present invention is operable with only one driver, as shown. Driver 20 includes a feedback circuit which includes motion sensor 30 which is mounted on the pipe directly opposite driver 20 or near driver 20 or affixed onto driver 20.

The flowmeter elements further include a second motion sensor 32 mounted onto pipe 10 at a zero flow vibration node location 31. A third motion sensor 34 may be mounted onto a non-moveable element, such as support 14. Motion sensors 30 and 32 are affixed directly to pipe 10. Counterweight 40 may be mounted on pipe 10 at a predetermined location, such as a harmonic anti-node of the natural vibration frequency of pipe 10, to balance the load created by driver 20. If desired, a second driver may be mounted at this location, or the counterweight 40 or a second driver can be eliminated.

If desired, the flowmeter of FIG. 1 can be prefabricated in advance as a specially provided pipe section which is then incorporated into an existing pipe system. A section of the existing pipe is removed and the prefabricated tube with the flowmeter elements of FIG. 1 already affixed to it is inserted in place of the removed section of pipe. This embodiment can be stocked as an off the shelf item ready for installation. The operation of this flowmeter is similar to the one described above.

Operation of the System

Pipe 10, between supports 12, 14, if present, is vibrated by driver 20 at a harmonic, such as the second, of the natural frequency of pipe section 10. This frequency is a function of the characteristics of the pipe, including its length, mass, physical properties and the like. The amplitude curve 200 of FIG. 2 portrays the zero flow state, of pipe section 10 vibrating at its second harmonic frequency. This frequency of vibration is maintained by driver 20 and accelerometer 30 via a feedback circuit, as later described.

Figure 2:
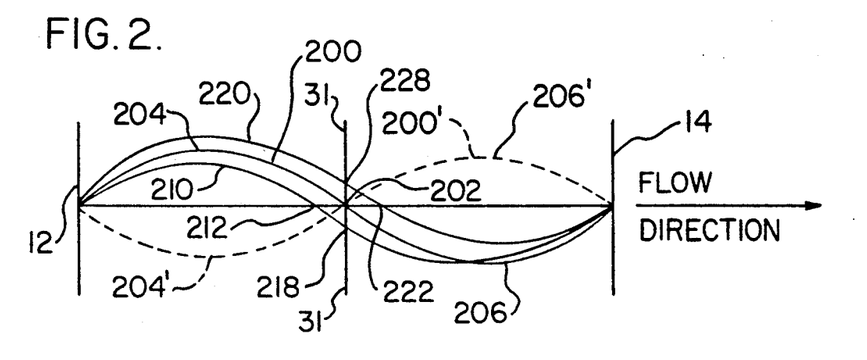
FIG. 2 shows a basic zero flow amplitude of oscillation curve of the second harmonic of the natural frequency of a pipe section and the amplitude of oscillation curves due to the Coriolis effect forces as material flows through the pipe.

Curve 200 has zero amplitude at each end where the pipe is fixed by supports 12, 14 and at the zero flow node location 202 when there is no flow. Motion sensor 32 of FIG. 1 is affixed to pipe 10 at location 31. Sensor 32 is illustrated in FIG. 1 as being at the midpoint 31 of pipe 10 between supports 12, 14. However, zero flow node location 31 and sensor 32 may be at various locations between the supports 12 and 14. This is a result of a possible asymmetrical loading on pipe 10, physical characteristics of the pipe, the use or nonuse of additional drivers and counterweights, and other factors.

The peak amplitudes of curve 200 occur at anti-nodes 204, 206. Driver 20 is preferably mounted on pipe 10 at or near anti-node 204 and counterweight 40, which may be a second driver, may be mounted at or near anti-node 206 to equalize the driving forces and pipe loading. Driver 20 can be mounted at any location except zero flow node location 202. Locating the driver at an anti-node is preferable in order to enhance the efficiency of operation.

Driver 20 applies a transverse force to pipe 10 and then releases this force to cause pipe 10 to oscillate. This is indicated by amplitude curve 200 during the forced portion of the cycle and by amplitude curve 200' during the unforced portion of the cycle. Anti-nodes 204, 206 are reversed in amplitude in every cycle and have locations at 204' 206' during the unforced portion of the cycle.

The vibration of pipe 10 with material flowing therethrough produces cyclically varying Coriolis forces on each element of the pipe. The amplitude curves 210, 220 of the pipe with fluid flow are illustrated in FIG. 2 and portray the extremes of the pipe movements caused by the cyclically varying Coriolis forces. The pipe 10 deflection amplitudes are exaggerated on FIG. 2 in order to explain the operation of the system of FIG. 1. During a first portion of the pipe vibration cycle, the Coriolis forces on pipe 10 causes amplitude curve 210 (corresponding to the first portion of the driving cycle) to shift to the left as compared to amplitude curve 200 of the zero flow state. The material flowing in pipe 10 resists effects imparted by the vibrating pipe. The initial portion of curve 210 is reduced in amplitude as compared to curve 200 due to the Coriolis force effects of the material acting against the walls of pipe 10. This causes the node (the print of zero amplitude) of amplitude curve 210 to shift to the left to position 212. Likewise, the Coriolis force effects on pipe 10 during the second portion of the pipe vibration cycle result in amplitude curve 220 of the pipe. Node 222 (point of zero amplitude) of curve 220 is shifted to the right and leads node 202 of curve 200.

The cyclical longitudinal displacement of node 212 and node 222 creates a cyclical transverse amplitude displacement of the zero flow nodal location 202 (where sensor 32 is located) of pipe 10. This transverse displacement, illustrated in FIG. 2, occurs between point 218 of curve 210, showing the displacement of curve 210 from zero flow node location 202, and point 228 of curve 220 showing the displacement of curve 220 from zero flow node location 202. This cyclical transverse displacement of the zero flow node location is due to the Coriolis force effects of the fluid flow through vibrating pipe 10. Since the Coriolis force effects are due to the mass of the material flowing in pipe 10, the measured transverse acceleration and the displacement of the zero flow node is indicative of the mass flow rate of the material.

Motion sensor 32 is mounted at the zero flow nodal location 31 on pipe 10 to measure the amplitude of the cyclical transverse displacement of pipe 10. In one possible preferred embodiment, sensor 32 is an accelerometer that measures the acceleration of pipe 10 at zero flow node location 31. Accelerometer 32 is mounted directly onto pipe 10 and, unlike prior art motion detectors, does not require a stable external point of reference. The signal output of accelerometer 32 is processed to provide the mass flow rate, total amount of mass, and other measurement information. This signal is dependent only upon the amplitude of the transverse displacement of pipe 10 at the zero flow nodal mounting location 202 and does not require the measurement of phase shifts. This provides an accurate, dependable measurement and is less susceptible to extraneous, noise and vibrations. Sensor 32 cooperates with sensor 34 mounted on support 14 to eliminate or reduce noise in the signal output of sensor 32. The operation of the sensors and related circuitry is subsequently discussed in detail. It should be clearly understood that the amplitude measured by sensor 32 is not directly proportional to mass flow rate, it is only indicative of it. The reason for this is that accelerometer 32 produces a signal which is proportional to acceleration, while the mass flow rate is proportional to displacement. Displacement is the second integral of acceleration. Therefore to read a mass flow rate at any pipe frequency (which is related to and varies with the density of the material in the pipe), the acceleration measured by sensor 32 is modified according to the frequency of the pipe vibration.

The Driving Mechanism 20

Driver 20 oscillates pipe 10 at a harmonic frequency, such as the second, of the natural frequency of pipe 10.

Figure 3:
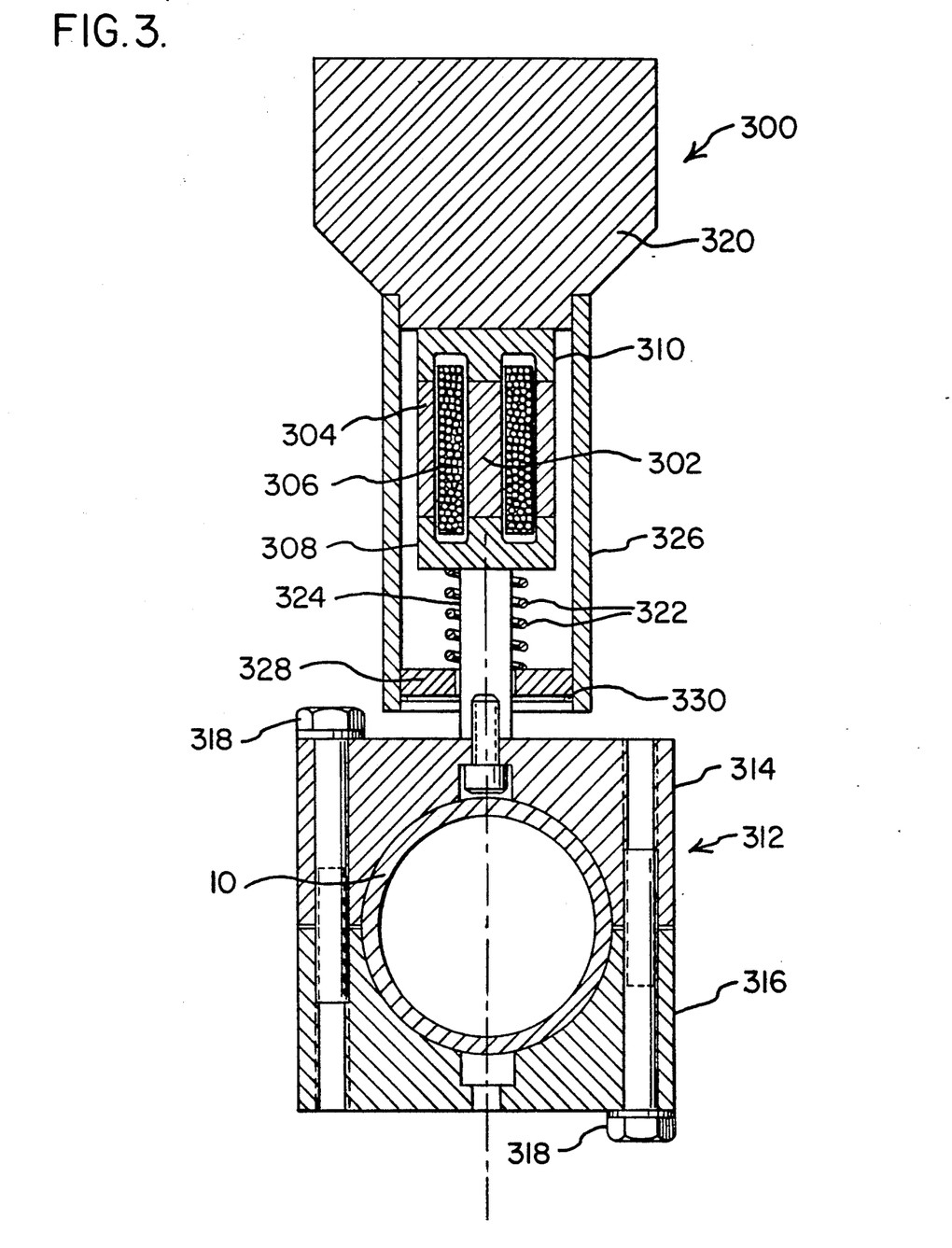
FIG. 3 is a side cut-away view of a magnetostrictive driver of one possible exemplary preferred embodiment of the present invention.

Several mechanisms are shown to perform this function. One possible embodiment of driver 20 is illustrated in FIG. 3. Driver 300 is a magnetostrictive transducer, capable of being clamped directly onto pipe 10 and generating sufficient force to oscillate pipe 10. Driver 300 can also be used as a sensor, as later discussed. The exact parameters of the driver are dependent upon the power, force, frequency, and displacements required for operation. However, the design of the driver of this embodiment is substantially the same for all variations.

Driver 300 includes a cylindrical rod 302 formed of an alloy, such as TERFENOL-D, which is commercially available. Tubular permanent magnet 304 surrounds rod 302 to provide a magnetic bias field. Due to the reversible properties of the described embodiment, the driver can also function as a sensor to measure vibrational forces. Pre-stress is provided on driver 300 by die spring 322. Solenoid coil 306 is contained within permanent magnet 304 surrounding rod 302 to provide a driving magnetic field. The magnetic circuit is completed by soft iron caps 308, 310. Solenoid coil 306 and magnet 304 are both bonded to upper pole cap 310.

Clamp assembly 312 mounts driver 300 onto pipe 10. Clamp assembly 312 includes upper mounting plate 314, and lower mounting plate 316, each having arcuate portions sized to mate with pipe 10. Bolts 318 clamp mounting plates 314, 316 on pipe 10.

Mass 320 is secured on driver 300 to provide an opposing mass to pipe 10 so that most of the energy produced by the driver is transferred to pipe 10. Connecting rod 324 constrains spring 322 to vertical movement. Outer shell 326 contains the interior of the driver as well as cooperating with end plate 328 to hold spring 322 in compression. Retaining ring 330 retains end plate 328 in place on shell 326.

Figure 5:
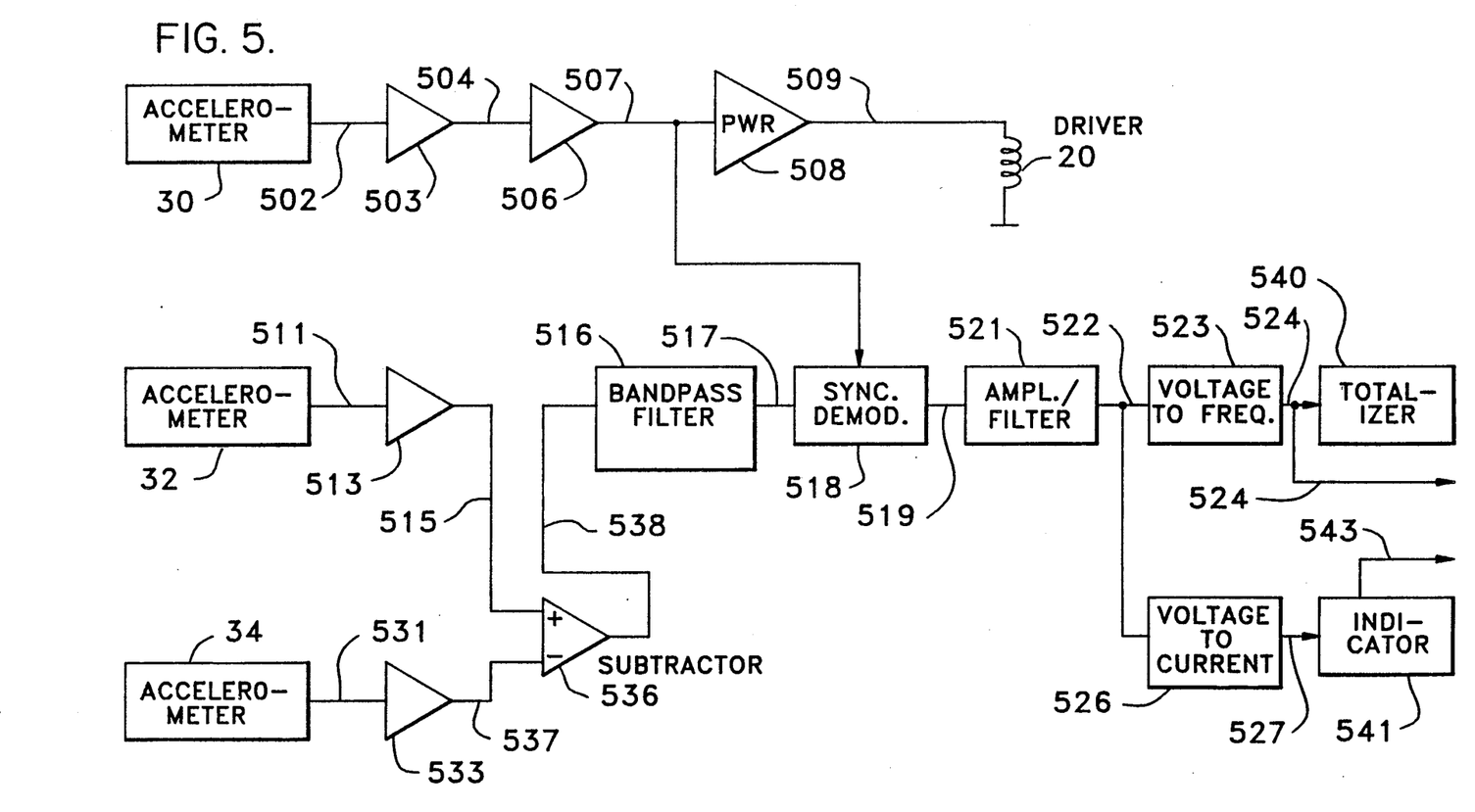
FIGS. 5 and 6 show two different circuit embodiments that cooperate with the embodiment of FIG. 1 to generate mass flow information.
Figure 6:
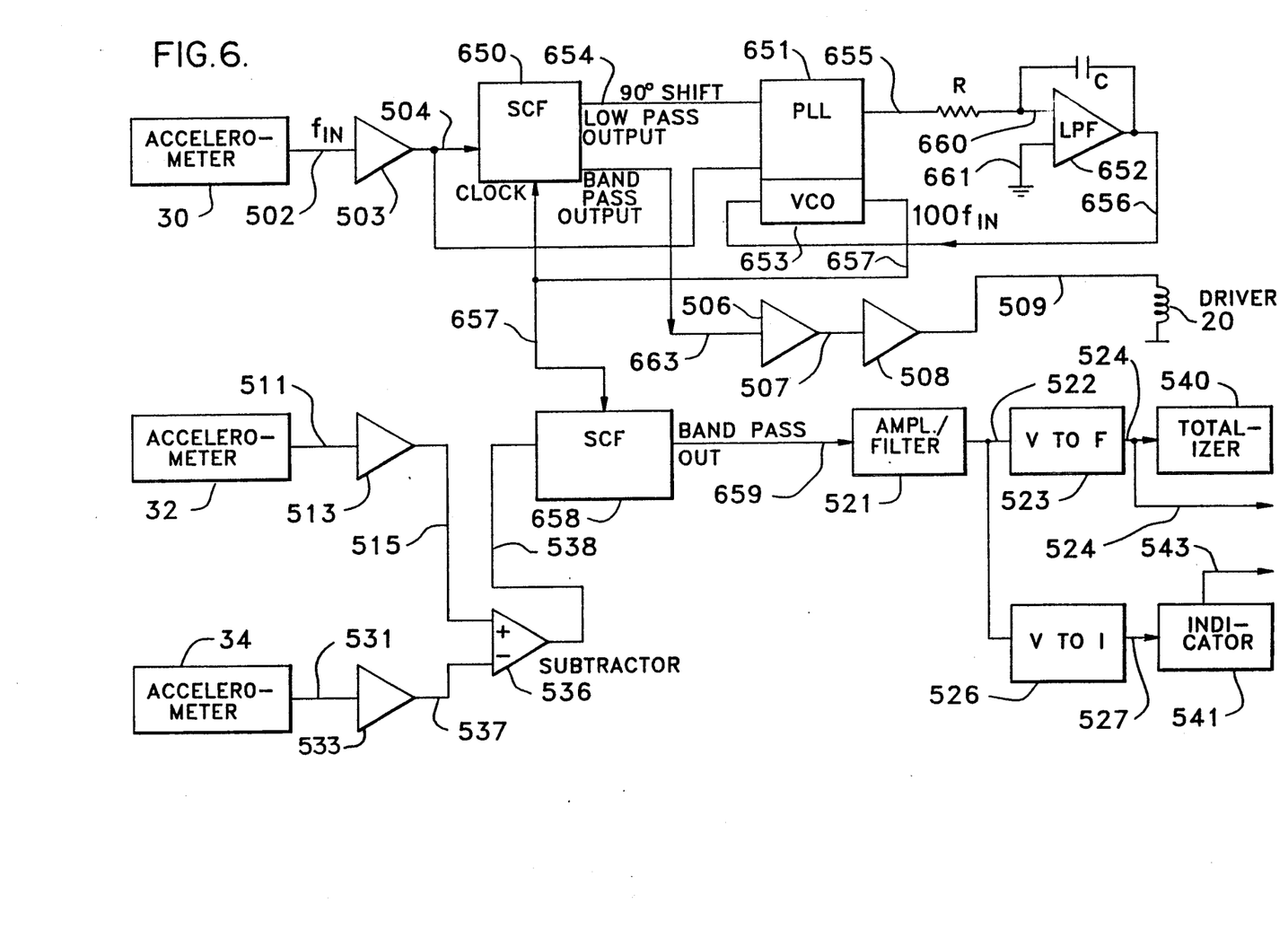
Figure 7:
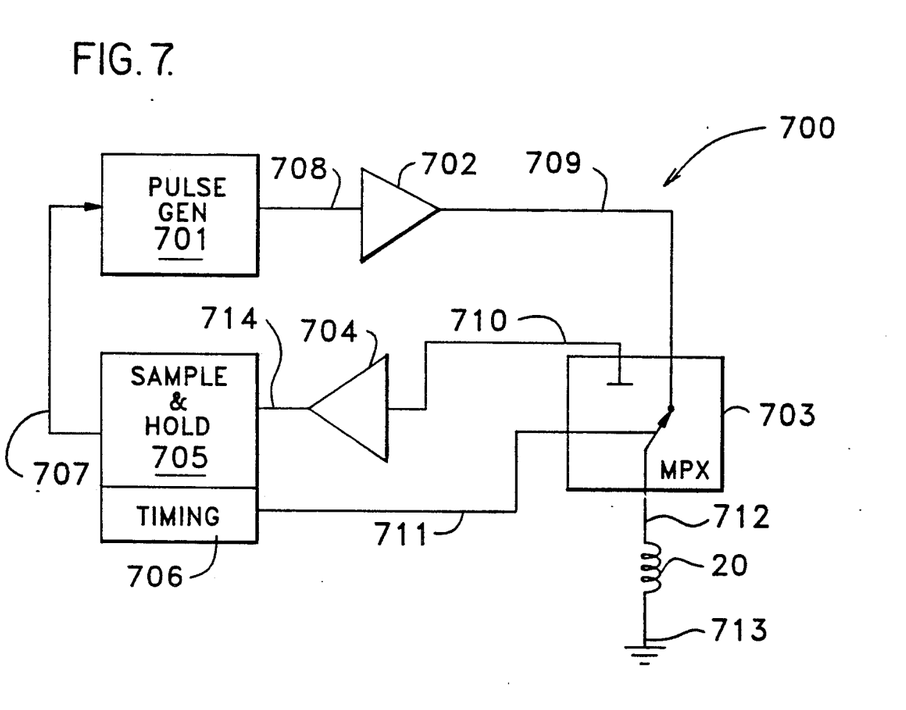
FIG. 7 shows an alternative embodiment of control circuitry for driver 20.

An alternating current is applied to coil 306 by the circuitry of FIGS. 5, 6, or 7 to provide a magnetic field to nickel alloy rod 302. This magnetic field having been added to the bias field of permanent magnet 304 causes rod 302 to elongate. When an alternating current is applied to coil 306, rod 302 elongates and returns back to its normal length at the frequency of the alternating current. A force is generated by the elongation of rod 302 which is transmitted through guide rod 324 and clamp assembly 312 to pipe 10. Mass 320 provides a reactionary force against rod 302 so the force from the elongation of rod 30 is transferred to pipe 10. As the current changes direction in the second half of the alternating current cycle, the driving magnetic field in coil 306 is reduced and rod 302 returns to its normal length. This removes the force from pipe 10. The cyclical changes in elongation of rod 302 create a driving force against pipe 10 to oscillate the pipe. The oscillation of pipe 10 can be controlled by controlling the amplitude and frequency of the drive current applied to coil 306. A feedback circuit is used to maintain the oscillation of pipe 10 at the correct frequency and at a necessary amplitude.

Magnetostrictive driver 300 can also be used as a sensor for feedback purposes to control the amplitude and frequency of the driving force. In this embodiment the drive current to coil 306 can be periodically interrupted, for instance, every five to ten cycles. During each interruption, driver 300 operates as a signal detector. Rod 302 is then compressed by the oscillating pipe and counterweight 320. This compression generates an electromagnetic field in coil 306. The resultant voltage is sampled as driver 300 functions as a pickup sensor to control the frequency and amplitude of oscillation of pipe 10.

Second Preferred Embodiment of the Driver

Figure 4:
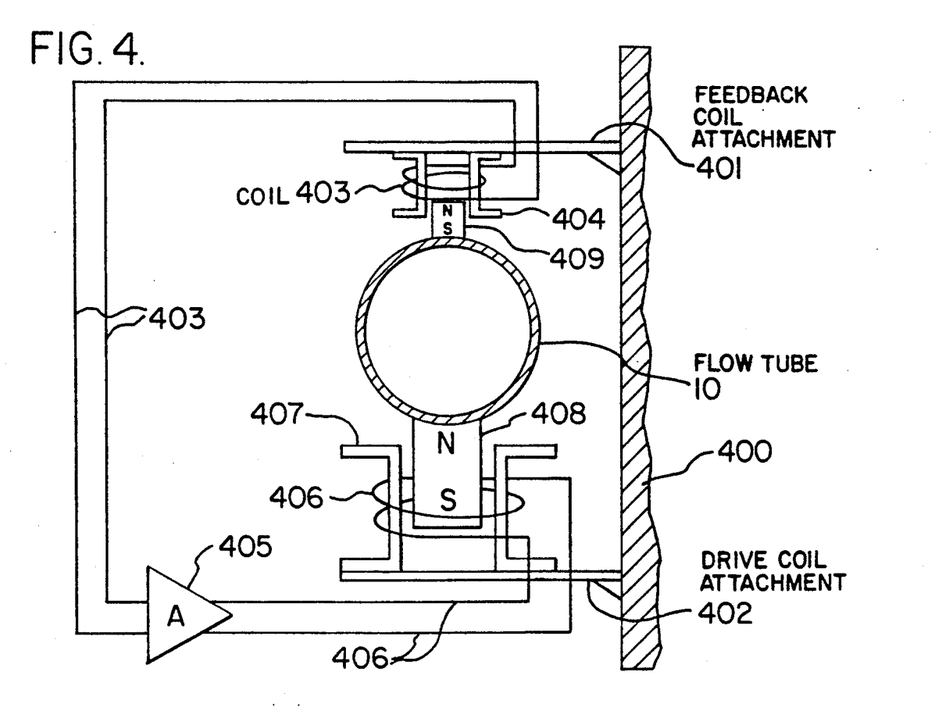
FIG. 4 is a side cut-away view of a electromagnetic drive comprising a second possible exemplary preferred embodiment of the present invention.

A second possible exemplary preferred embodiment of driver 20 is illustrated in FIG. 4. Driver 400 utilizes an electromagnetic coil 406 to oscillate pipe 10. Driver 400 includes feedback coil 403 supported by bobbin 404 on an external support 401. Permanent magnet 409 is affixed onto pipe 10 with bobbin 404 slidably mounted thereover. Coil wires 403 are spirally wound about bobbin 404 to form a solenoid. Coil wires 403 extend from the solenoid to an input of amplifier 405. A second set of coil wires 406 are connected to the output of amplifier 405 and are spirally wound about bobbin 407. Bobbin 407 is slidably mounted over permanent magnet 408 which is also secured to pipe 10 to form a driving solenoid. Bobbin 407 is supported by external support 402. A signal from feedback coil 403 is applied to amplifier 405 which applies a drive signal to create a magnetic field in coil 406. By applying an alternating drive current to coil 406, the solenoid oscillates pipe 10. Feedback coil 403 and amplifier 405 maintain the circuit in oscillation at the second harmonic mode of the natural frequency of pipe 10.

Description of FIG. 5

FIG. 5 discloses the details of circuitry that cooperates with accelerometers 30, 32, and 34 and driver 20 to vibrate pipe 10 of FIG. 1 at the second harmonics of its natural frequency and to generate the information regarding the flow of material in pipe 10. Accelerometers 30, 32 and 34 are the same elements shown on FIG. 1 and are used to supply signals to the circuitry of FIG. 5. Driver 20 of FIG. 1 is shown in the upper right hand corner of FIG. 5. This circuitry receives a signal from accelerometer 32 representing the movement of the zero flow node location of pipe 10 resulting from the Coriolis force generated by material flowing through pipe 10 as it is vibrated at a harmonic of its natural frequency. It processes this signal and converts it from a voltage to a frequency signal which may be used to determine the mass of the material flow through the pipe during a period of time. It further converts this signal from a voltage to a current modulated signal to indicate the mass flow rate of the material within pipe 10.

The upper row of elements on FIG. 5 comprises a self-tuned oscillator which uses accelerometer 30 to detect the oscillation of pipe 10 caused by driver 20. The output of accelerometer 30 controls the frequency and amplitude of the signal applied to driver 20. As shown on FIG. 1, accelerometer 30 is attached to or associated with the same portion of pipe 10 to which driver 20 is attached or associated. The output of accelerometer 30 is applied over path 502 to amplifier 503 which applies its output signal over path 504 to variable gain amplifier 506. Amplifier 506 has an internal reference potential representing the maximum amplitude of the output signal to be applied to path 507. Amplifier 506 receives the output of amplifier 503 and applies to path 507 an output signal having the desired controlled amplitude. This controlled signal is applied to power amplifier 508 which applies over path 509 to driver 20 a signal of the required controlled amplitude to vibrate pipe 10 at a harmonic of its natural frequency.

The middle row of elements on FIG. 5, beginning with accelerometers 32 and 34 on the left and extending to elements 540 and 541 on the right, detect the amplitude of the movement of the zero flow node location of pipe 10 associated with accelerometer 32 and apply a frequency modulated signal to path 524 and a current modulated signal to path 527. Accelerometer 32 drives amplifier 513 over path 511 which applies an amplified signal over path 515 to the non-inverting input of amplifier 536. Accelerometer 34 is connected to the outside environment, such as the foundation to which clamp 14 of FIG. 1 is mounted in order to detect external noise which might be imparted to pipe 10. The output of accelerometer 34 is applied over path 531 to amplifier 533 which applies its output over path 537 to the inverting input of amplifier 536. The gain of amplifier 533 is adjusted so as to apply to the inverting input of amplifier 534 a noise signal whose amplitude matches the component of the noise signal picked up by accelerometer 32 and applied to path 515. Amplifier 536 reduces the noise component of signal 515 and applies a signal over path 538 to band pass filter 516. Band pass filter 516 filters out other unwanted frequencies so that its output on path 517 has only the desirable and useful frequency components of the signal originally generated by accelerometer 32. This filtered signal on path 517 is applied to the input of synchronous demodulator 518 which also receives on path 507 an input representing the drive signal. Synchronous demodulator 518 receives both the drive signal on path 507 and the filtered signal on path 517 and generates an output signal which contains only those frequency elements which are associated with the natural resonant frequency of pipe 10. Amplifier/filter 521 amplifies and further filters the signal on path 519 and its output signal 522 represents a mass flow rate signal which is applied to voltage-to-frequency converter 523 and to voltage-to-current converter 526. Element 523 converts the signal on path 522 from a voltage to a proportional frequency signal which is applied over path 524 to totalizer 540 which integrates the received signal. The signal on path 524 can also be applied to external devices. Signal 522 is also applied to voltage to current converter 526 whose output 527 is applied to indicator 541. Signal 527 comprises a current that is proportional to the mass flow rate and its receipt permits element 541 to indicate on path 543 the mass flow rate of the material in pipe 10.

Description of FIG. 6

FIG. 6 discloses details of circuitry comparable to but an alternative to that of FIG. 5. The circuitry of FIG. 6 receives output signals of accelerometers 30, 32 and 34, generates a signal that causes driver 20 to oscillate pipe 10 at a harmonic of its natural frequency, and generates signals that cause totalizer 540 to represent the mass flow total over a period of time and to cause element 541 to generate an output signal representing the mass flow rate within pipe 10. The circuitry of FIG. 6 uses the switched capacitor filters (SCF) 650 and 658 together with phase lock loop (PLL) 651 instead of the band pass filter 516 and the synchronous detector 518 of FIG. 5.

In order to facilitate a comparison of the circuitry of FIGS. 5 and 6, elements on FIG. 6 which are identical to those on FIG. 5 are designated in a corresponding manner with numbers in the 500 series while elements on FIG. 6 that are not shown on FIG. 5 are designated with reference numbers in the 600 series. Accelerometers 30, 32 and 34 and driver 20 are identically designated on both FIGS. 5 and 6 and these elements perform the same functions as already described.

Accelerometer 30 and amplifier 503 function in the manner of FIG. 5 to detect and amplify a signal indicative of the motion of the portion of the that is vibrated by driver 20. This signal is applied over path 504 to the input of switched capacitor filter 650 and to an input of phase lock loop 651. The switched capacitor filter 650 functions as subsequently described to apply a band pass filtered signal over path 663 to the input of amplifier 506 which functions as described for FIG. 5 as a variable gain amplifier to control and limit the amplitude of the signal applied to driver 20. The output of amplifier 506 is applied over path 507 to power amplifier 508 which applies a drive signal over path 509 to driver 20.

As described for FIG. 5, accelerometers 32 and 34, together with their associated circuitry including noise cancellation amplifier 536, apply a signal over path 538 to switched capacitor filter 658. Signal 538 represents the detected movement of the zero flow node portion of pipe 10 associated with accelerometer 32 caused by the combined effect of driver 20 and the Coriolis force resulting from the flow of material within pipe 10 as the pipe is vibrated at a harmonic of its natural frequency. Signal 538 is applied to switched capacitor filter 658 which filters it and applies a band pass filtered signal over path 659 to amplifier/filter 521. Element 521 operates in a manner similar to that already described on FIG. 5 to drive voltage to frequency converter 523 and voltage to current converter 526. These elements cause totalizer 540 and indicator 541 to provide outputs representing the total mass flow on path 524 and of the mass flow rate on path 543.

SCF 650 and PLL 651 cooperate with voltage controlled oscillator 653 so that switched capacitor filter 650 can efficiently filter the signal received on path 504. In order to do this, switched capacitor filter 650 must receive a clock signal that is a controlled multiple of the frequency of the input signal on path 504. The signal on path 504 is applied to both SCF 650 and PLL 561. PLL 651 detects the frequency and phase of the signal on path 504 and path 654 and, by means of its voltage controlled oscillator (VCO) 653, applies a clock signal to path 657 that is the required multiple of the frequency of the signal on path 504. PLL 651 locks onto signals that are 90 degrees shifted relative to each other on paths 504 and 654. When SCF 650 is tuned by the clock signal on path 657 to the exact frequency of the signal on path 504, the low pass output 654 of the switch capacitor filter is in this desirable 90° phase shift situation. PLL 650 is tuned to close the loop by providing the desired clock frequency on path 657 and it maintains this relationship through the operating range of the flowmeter regardless of any possible variations of frequencies of input signal 504. The signal on path 655 from PLL 651 is filtered by low pass filter 652 and applied over path 656 to VCO 653 to provide an input signal representing the frequency of the input signal on path 504. The circuitry on FIG. 6 including SCF 650, PLL 651 and low pass filter (LPF) 652 is similar to that shown in the article entitled, "Clock Tracks Switch-Cap Filter" by Marcus Julian on page 131 of *Electronic Design* dated Jan. 12, 1989.

Description of FIG. 7

FIG. 7 discloses an oscillator and drive circuit which is an alternative to that of FIGS. 5 and 6 and which permits the coil of driver 20 to function both as a drive coil, as previously described, as well as a detector. This eliminates the need for accelerometer 30. Drive circuit 700 on FIG. 7 comprises the pulse generator 701, a multiplexer 703, driver 20, sample and hold circuit 705 and timing circuit 706. The operational position of multiplexer 703 is controlled over path 711 by timing circuit 706. This circuit controllably permits input 712 of driver coil 20 either to be connected over path 709 to the output of amplifier 702 or over path 710 to the input of amplifier 704.

Sample and hold 705 includes a circuit which operates under control of timing circuitry 706 and which receives input signals from the output of amplifier 704. The sample and hold circuit periodically sends control signals over path 707 to pulse generator 701 to cause it to generate a pulse of a predetermined amplitude and width. This generated pulse is applied over path 708, amplified by amplifier 702 and applied over path 709 to drive coil 20 when multiplexer 703 is in the position illustrated on FIG. 1. This pulse causes the pipe to which drive coil 20 is attached to move.

Subsequent to the generation of this pulse, the sample and hold circuit transmits a signal over path 711 to cause the multiplexer to switch to its operational position in which drive coil 20 is connected to path 710. In this position, the movement of the pipe resulting from the application of the first drive pulse to coil 20 induces a voltage in coil 20 which is now operating as a signal detector. This detected signal is applied over path 710, amplified by amplifier 704 and applied over path 714 to sample and hold circuit 705. The circuit analyzes the characteristics of the received signal to determine whether the pipe is vibrating at the correct amplitude and frequency.

If the pipe's vibration amplitude and frequency are correct, sample and hold circuit 705 causes the operational position of the multiplexer to revert to that shown on FIG. 1 and transmits a control signal over path 707 to pulse generator 701 so that it now generates a second pulse having the same characteristics as the first generated pulse. This second pulse is applied via amplifier 702 and multiplexer 703 to drive coil 20 to continue the oscillation of pipe 10 at the correct frequency and amplitude.

Alternatively, if the sample and hold circuit 705 determines from the signal on path 714 that the pipe is not vibrating at the correct amplitude and frequency, it alters the characteristics of the signal it applies to path 707 to command pulse generator 701 to alter the characteristics of its generated pulse that is applied to drive coil 20. This causes pipe 10 to be vibrated at the correct frequency and amplitude.

It may be seen from the above that the circuit of FIG. 7 is advantageous in that it eliminates the need for the provision of accelerometer 30 as a separate feedback element for the drive circuitry of driver 20. This is done by using the driver 20 as a dual functional element wherein at one period of time it is connected by multiplexer 703 to a drive signal to vibrate the pipe 10 at the required amplitude and frequency. At another period of time, driver 20 is used as a signal detector when the operational position of the multiplexer switches so that the coil of driver 20 is connected to circuitry including a sample and hold circuit and its signal processor which controls the amplitude and frequency of the drive signals to driver 20.

The preceding has shown how the circuitry of FIG. 5 or FIG. 6 or FIG. 7 can be used to generate and apply drive signals to driver 20. If desired, the apparatus and circuitry shown in U.S. Pat. No. 5,009,109 of Apr. 23, 1991, to Paul Kalotay et al. could be used to generate and apply a non-continuous drive signal to driver 20.

Figure 8:
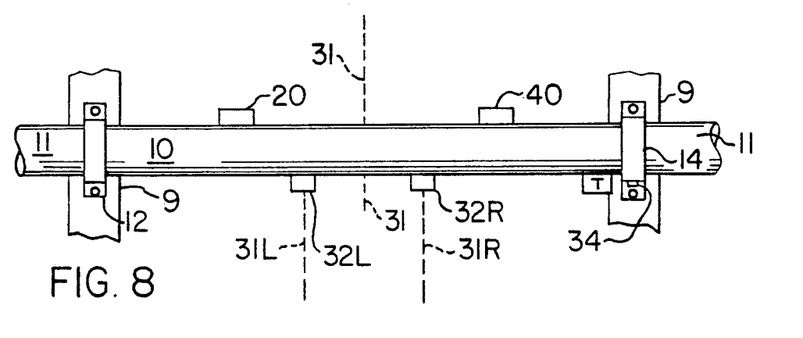
FIG. 8 represents a second possible exemplary embodiment of the invention.
Figure 9:
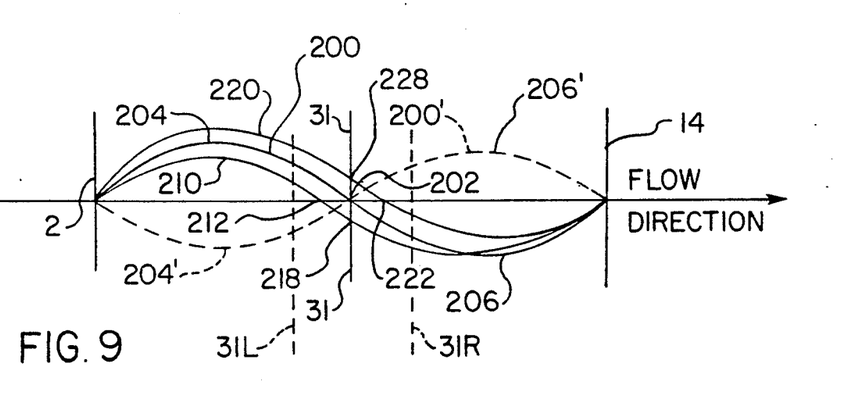
FIG. 9 shows a basic zero flow amplitude of oscillation curve of the second harmonic of the natural frequency of a pipe section and the amplitude of oscillation curves due to the Coriolis effect forces as material flows through the pipe.

Description of FIGS. 8 and 9

FIG. 8 discloses a second possible exemplary embodiment of the invention which utilizes a pair of sensors 32L and 32R rather than the single sensor 32 of the embodiment of FIG. 1. The embodiment of FIG. 8 is otherwise similar to the embodiment of FIG. 1 in that it has a driver 20 and a counterweight 40 if desired, clamped to a pipe section 10 which may be supported by elements 12 and 14, if necessary, to define a suitable frequency of vibration of pipe 10. The sensor 30 of FIG. 1 is not needed for feedback purposes for driver 20 in the embodiment of FIG. 8. A temperature sensor T is used in the embodiment of FIG. 8 to generate information indicating the temperature of pipe section 10. This temperature information is used to compensate for the variations of the Young's modules of pipe section 10 caused by material temperature changes. Although not specifically shown, a similar temperature sensor T may be used in the embodiment of FIG. 1 if it is desired to supply temperature information to the signal processing circuitry of FIG. 5 or 6 to generate a more precise indication of mass flow information.

The embodiment of FIG. 8 includes a pair of sensors 32L and 32R positioned on opposite sides of the center or anti-node 31 of pipe section 10. The two sensors generate sine wave output signals which are displaced in phase or time from each other as a result of the transverse motion of pipe 10 caused by the concurrence of the oscillations imparted by driver 20 and the resultant cyclical Coriolis forces generated by the material flow through pipe 10. The amplitude of the output signal generated by each driver 32L and 32R represents the instantaneous acceleration of the portion of the pipe section 10 to which it is affixed.

The oscillation of pipe section 10 with material flowing therethrough produces Coriolis forces on pipe 10. The amplitude curves 210 and 220 of the pipe with fluid flow are illustrated on FIG. 9 and portray the extreme of the pipe movements caused by the Coriolis forces. The sensors 31L and 31R are affixed to the pipe 10 at locations represented by the dashed lines 31L and 31R which extend downward to FIG. 9 to show the instantaneous amplitude of the pipe acceleration detected by sensors 32L and 32R. The pipe 10 deflection amplitudes are exaggerated on FIG. 9 in order to better explain the operation of the system of FIG. 1. The two sensors 32L and 32R each generate a sine wave output that is proportional to the acceleration of the portions of the pipe 10 to which it is affixed. Due to the Coriolis forces which are generated while material is flowing through the oscillating pipe 10, the sine wave outputs of the two sensors are delayed relative to each other an amount that is proportional to the mass flow rate of the material currently flowing through pipe 10.

Figure 10:
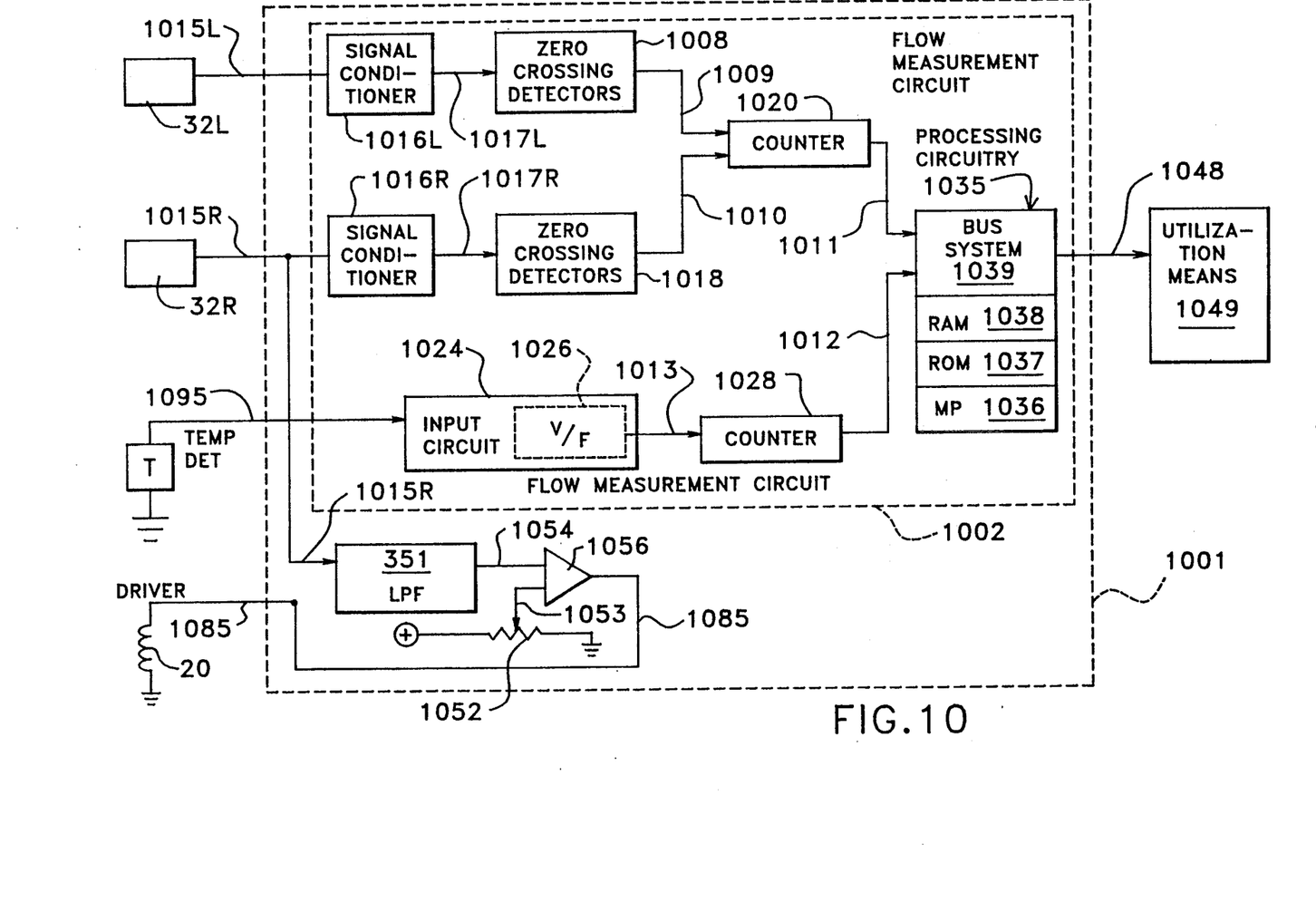
FIG. 10 illustrates circuitry that cooperates with the embodiment of FIG. 8 to generate mass flow information.

Description of FIG. 10

FIG. 10 discloses the details of the circuitry 1001 that receives the signal output of sensors 32L and 32R on paths 1015L and 1015R and, in response thereto, generates output information, such as the mass flow rate, for the material flowing through pipe section 10. Circuitry 1001 includes the elements comprising the flow measurement circuit within the dashed rectangle 1002 as well as the driver circuitry comprising elements 1051 and 1056 together with their associated circuit elements.

The output of sensor 32R is applied via conductor 1015R to the input of low pass filter 1051 and from there over path 1054 to the input of driver amplifier 1056. The output of driver amplifier 1056 extends over path 1085 to the coil of driver 20. The amplitude of the drive signal is controlled by potentiometer 352. The frequency of the drive signal is the natural frequency of vibration of the pipe section 10 to which driver 20 and sensors 32L and 32R are affixed.

The output signals from sensors 32L and 32R are applied over conductors 1015L and 1015R to signal conditioners 1016L and 1016R. Signal conditioners 1016L and 1016R may include amplifiers and integrators, as required, to condition the signals generated by sensors 32L and 32R so that they may be of the proper characteristics required by the remainder of the circuit 1001 of FIG. 10.

The output signals 1017L and 1017R from signal conditioners 1016L and 1016R, respectively, are applied to zero crossing detectors 1008 and 1018 of the flow measurement circuitry 1002. Flow measurement circuitry 1002 includes processing circuitry 1035 which processes the left and right position signals on leads 1017R and 1017L, respectively, along with the temperature signal on lead 1095, in a well known manner (disclosed, for instance, in U.S. Pat. No. 4,843,890 of Jul. 4, 1989, to Allan L. Sampson and Michael J. Zolock) to calculate information including the mass flow rate of the material passing through Coriolis effect flowmeter assembly 10. Output information is applied over path 1048 to utilization means 1049 which may be either a display or a process control system.

Inasmuch as the method by which flow measurement circuitry 1002 generates information (including the mass flow rate) is well known to those skilled in the art, only that portion that is germane to the present invention is discussed below.

The left and right sensor displacement signals 1017L and 1017R from signal conditioners 1016L and 1016R are applied to respective zero crossing detectors (effectively, comparators) 1008 and 1018, which generate level change signals whenever the corresponding position signal exceeds a voltage window defined by a small predefined positive and negative voltage level, e.g. ±2.5 V. The outputs 1009 and 1010 of zero crossing detectors 1008 and 1018 are fed as control signals to counter 1020 to measure timing intervals, in terms of clock pulse counts, that occurs between corresponding changes in outputs 1009 and 1010. These intervals are the $\Delta t$ value of sensors 32L and 32R and they vary with the mass flow rate of the material through tubes pipe section 10. These $\Delta t$ values, in digital form, are applied in parallel as input data to processing circuitry 1035.

Temperature detector T is connected by path 1095 to circuit 1024 which supplies a constant drive current to temperature detector element T, linearizes the voltage that appears across the temperature detector element T and converts this voltage using voltage/frequency (V/F) converter 1026 into a stream of pulses that has a scaled frequency which varies proportionally with any temperature changes detected by temperature sensor T. The resulting pulse stream produced by circuit 1024 is applied as an input to counter 1028, which periodically counts the stream and produces a signal, in counts, that is proportional to the measured temperature. The output of counter 1028 is applied as input data to processing circuit 1035.

Processing circuit 1035, which is advantageously a microprocessor based system, determines the mass flow rate from the digitized $\Delta t$ information and temperature values applied thereto. The digitized temperature value is used to modify a meter factor value based upon the temperature of the flow tubes. This compensates for changes in flow tube elasticity with temperature. The temperature compensated meter factor is then used to calculate the mass flow rate and volume flow rate from the measured $\Delta t$ value and calculated density value. Having determined the mass flow rate and the volume flow rate, circuitry 1035 then updates the output signals applied over leads 1048 to utilization means 1049.

Processing circuitry 1035 on FIG. 10 includes microprocessor 1036 and memory elements including a ROM memory 1037 and a RAM memory 1038. The ROM 1037 stores permanent information that is used by microprocessor 1036 in performing its functions, while RAM memory 1038 stores temporary information used by microprocessor 1036. Microprocessor 1036 together with its ROM 1037 and RAM 1038 memories and bus system 1039 control the overall functions of the processing circuitry 1035 so that it can receive signals from counters 1020 and 1028 and process them in the manner required to calculate and apply over path 1048 to utilization means 1049 the various items of data the Coriolis effect meter of the present invention generates. This information includes the mass flow rate and volume flow rate of the measured material.

The following describes in further detail how the processing circuitry 1035 on FIG. 10 operates to compute the mass flow rate of the material flowing in pipe section 10. The output of counter 1020 represents the term $\Delta t$ which is the time difference between the time at which sensor 32R crosses the predetermined reference points as it is vibrated by forces and the time at which sensor 32L crosses the corresponding reference points. Counter 1020 is started by one of the zero crossing detector outputs 1009 or 1010 and is stopped by the other output. Several measurements are performed during the sinusoidal cycle. The results are averaged and an initial "0 value" is subtracted to produce a phase ($\Delta P$) or time ($\Delta t$) delay measurement. This $\Delta t$ factor is multiplied by a calibration factor K which is dependent upon the material and geometry of the meter structure. K is empirically determined in a flow calibration facility and is input to microprocessor circuitry 1035 at the factory in which the meter is constructed. This K is corrected for temperature during the operation of the flowmeter under control of the output 1012 of counter 1028. The units of K are grams/seconds/microsecond. This means that for every microsecond of time shift there will be a certain number of grams per second of mass flow rate. The mass flow rate is calculated by the processing circuitry 1035 according to the formula MFR=$\Delta t$K, where MFR is the computed mass flow rate. To determine K for a given meter, fluid is run through the flowmeter for a known amount of time and the fluid batch is weighed on a scale after passing through the flowmeter. The microprocessor meanwhile integrates the $\Delta t$ (microseconds) during the batching operation. Knowing the weight of the fluid, the time of the batch, and the integrated $\Delta t$ allows the calculation of K. U.S. Pat. No. 4,817,448 discloses microprocessor controlled circuitry that received $\Delta t$ input information and generates mass flow rate output information.

Definition of Terms

Some of the claims of this document use the expression "an existing pipe section comprising an integral part of an existing pipe system that is devoid of material flow measurement conduit means." By the use of this expression it is to be understood that the invention of the claims containing this expression is practiced only by modifying or retrofitting an "existing pipe section of an existing pipe system" with the driver and sensor elements specified in these claims. It is to be expressly understood that this expression excludes the prior attachment of driver and sensor elements to a pipe section (such as at a factory) followed by the installation of this previously-equipped pipe section into an existing pipe system, such as by cutting and welding, or by cutting and the use of pipe fittings, flanges, etc. In other words, this expression is to be understood as excluding the installation of a factory-built flowmeter into a pipe system.

While a specific embodiment of this invention has been disclosed, it is expected that those skilled in the art can and will design alternate embodiments of this invention that fall within the scope of the appended claims.

I claim:

1. A method of determining information including the mass flow rate of material flowing through a pipe section which is an integral part of an existing pipe system that is devoid of material flow measurement means, said method comprising the steps of:
   - affixing a motion sensor to a first location comprising a zero flow node of a harmonic of the natural frequency of vibration of said pipe section;
   - affixing a vibration driver to a second location of said pipe section;
   - operating said driver to oscillate said pipe section at said harmonic frequency;
   - said sensor and said driver being attached only to said pipe section and being free from attachment to a non-movable object; and
   - determining the mass flow rate of said material flowing through said pipe section by measuring with said motion sensor the amplitude of transverse deflections of said first location of said pipe section in a direction perpendicular to the longitudinal axis of said pipe section;
   - said transverse deflections of said pipe section being caused jointly by the oscillation of said pipe section and the Coriolis motion of said pipe section due to the flow of material through said pipe section.

2. The method of claim 1 wherein said pipe section is essentially straight and devoid of curves.

3. The method of claim 2 wherein said pipe section has an inner cross sectional area that is equal to the inner cross-sectional area of a supply portion and an exit portion of said existing pipe system integral with said pipe section.

4. The method of claim 3 wherein said method further comprises the steps of:
   - clamping a first and a second portion of said pipe section to a support structure; and
   - oscillating only the segment of said pipe section between said first and second portions at said harmonic frequency.

5. The method of claim 4 wherein said method further comprises the step of:
   - affixing a counter weight to a third location on said pipe section on an opposite side of said first location from said second location to which said driver is attached.

6. The method of claim 1 wherein said step of oscillating said pipe section comprises the steps of:
   - positioning a second motion sensor at said second location of said pipe section;
   - operating said second motion sensor to detect the amplitude of oscillation of said second location of said pipe section location;
   - applying an output signal from said second motion sensor to control circuitry to generate a drive signal of a substantially constant amplitude and at said harmonic of the natural frequency of vibration of said pipe section; and
   - applying said constant amplitude signal to said driver so that said driver oscillates said pipe section at a substantially constant amplitude and at said harmonic of the natural frequency of vibration of said pipe section.

7. The method of claim 1 wherein said method further comprises the steps of:
   - positioning another motion sensor on said pipe section to detect noise vibrations of the environment external to said pipe section;
   - applying an output signal of said another sensor to subtraction circuitry;
   - applying an output of said first motion sensor to said subtraction circuitry; and
   - said subtraction circuitry being effective to remove external environment noise signals in said output signal of said first motion sensor to provide a filtered signal representing the amplitude of the motion of said pipe section location caused jointly by said oscillations and by the Coriolis motion of said pipe section due to the flow of material in said oscillating pipe section.

8. The method of claim 1 wherein said harmonic frequency comprises the second harmonic of the natural frequency of vibration of said pipe section.

9. The method of claim 1 wherein said pipe section is essentially straight and devoid of curves;
   - wherein said pipe section has an inner cross sectional area that is equal to the inner cross-sectional area of said pipe system integral with said existing pipe section;
   - wherein said method further comprises the steps of:
   - clamping a first and second location of said pipe section to a support structure;
   - oscillating only said segment of said pipe section between said first and second locations at said harmonic frequency;
   - wherein said step of determining comprises the step of:
   - measuring with said motion sensor the amplitude of said transverse deflection of said first location of said pipe section caused by said material flow and said oscillation;
   - applying an output signal of said first motion sensor representing said measured amplitude to measuring apparatus;
   - operating said measuring apparatus for determining the mass flow rate of said material in said pipe in said pipe section;
   - wherein said method further comprises the step of:
   - affixing a counter weight to a third location on said pipe section an opposite side of said first location with respect to the location to which said driver is attached;

wherein said step of oscillating said pipe section comprises the steps of:

positioning a second motion sensor at said second location of said pipe section;

operating said second motion sensor to detect the amplitude of oscillation of said second location of said pipe section;

applying an output signal from said second motion sensor to control circuitry to generate a drive signal of a substantially constant amplitude and at said harmonic of the natural frequency of vibration of said pipe section; and applying said constant amplitude signal to said driver so that said driver oscillates said pipe section at a substantially constant amplitude and at said harmonic of the natural frequency;

wherein said method further comprises the steps of:

positioning a third motion sensor on said pipe section to detect noise vibrations of the environment external to said pipe section;

applying an output signal of said third sensor to subtraction circuitry;

applying an output of said first motion sensor to said subtraction circuitry;

said subtraction circuitry being effective to remove any external environment noise signal in said output signal of said first sensor to provide a filtered signal representing the amplitude of the motion of said first location of said pipe section caused jointly by said oscillations and by the Coriolis motion of said pipe section due to the flow of material in said pipe section; and wherein said harmonic frequency comprises the second harmonic of the natural frequency of vibration of said pipe section.

10. A method of determining the mass flow rate of material flowing through a pipe section which is an integral part of an existing pipe system devoid of material flow measurement conduit means, said method comprising the steps of:

clamping said pipe section at a first and a second location spaced apart from each other to inhibit transverse motion of said pipe section at said first and second locations;

affixing a first motion sensor to said pipe section at a third location between said first and second locations, said third location comprising a zero flow vibration node for a harmonic of the natural frequency of vibration of said pipe section;

affixing a vibration driver to said pipe at a fourth location between said third location and said first location, said fourth location not comprising a vibration node of said pipe section at said harmonic frequency;

said motion sensor and said vibration driver being attached only to said pipe section and being free from attachment to a non-movable object; and operating said driver to oscillate said pipe section at said harmonic frequency; and determining the mass flow rate of said material through said pipe section by measuring with said motion sensor the amplitude of transverse deflections of said third location of said pipe section in a direction perpendicular to the longitudinal axis of said pipe section;

said transverse deflections of said third location being caused jointly by the Coriolis motion of pipe section due to said material flow and said oscillation of said pipe section.

11. The method of claim 10 wherein said pipe section is essentially straight and devoid of curves.

12. The method of claim 11 wherein said pipe section has an inner cross sectional area that is equal to the inner cross-sectional area of said existing pipe system integral with said pipe section.

13. The method of claim 10 wherein said method further comprises the step of:

affixing a counter weight to a fifth location on said pipe section on an opposite side of said third location with respect to the said fourth location to which said driver is attached.

14. A method of determining the mass flow rate of material flowing through a pipe section which is an integral part of an existing pipe system devoid of material flow measurement conduit means, said method comprising the steps of:

clamping said pipe section at a first and a second location spaced apart from each other to inhibit transverse motion of said pipe section at said first and second locations;

affixing motion sensor means to said pipe section between said first and second locations;

affixing a vibration driver to said pipe section between said first and second locations;

said motion sensor means and said driver being attached only to said pipe section and being free from attachment to a non-movable object;

operating said driver to oscillate said pipe section at a harmonic of a natural frequency of vibration of said pipe section; and determining the mass flow rate of said material through said pipe section by measuring with said motion sensor means the transverse deflections of said of said pipe section caused jointly by the oscillation of said pipe section and the Coriolis motion of said pipe section due to the flow of material through said pipe section.

15. The method of claim 14 wherein said motion sensor means comprises at least two motion sensors affixed to different locations of said pipe section; and wherein said step of determining comprises the step of:

measuring with said at least two motion sensors said transverse deflections of said pipe section;

applying an output signal representing said measured deflections from each of said at least two motion sensors to measuring apparatus; and operating said measuring apparatus in response to said application of said output signals for determining the mass flow rate of said material in said pipe section.

16. The method of claim 15 wherein said output signals of said at least two motion sensors are phase displaced from each other by an amount dependent upon the magnitude of said material flow; and wherein said measuring apparatus determines said mass flow rate of said material based upon said phase displacement between said output signals.

17. The method of claim 14 wherein said motion sensor means is positioned at a zero flow node of a harmonic of the natural frequency of vibration of said pipe section; and wherein said step of determining comprises the step of:

measuring with said motion sensor means the amplitude of transverse deflections at said zero flow node of said existing pipe section caused jointly by the Coriolis motion of said existing pipe section due to said material flow and said oscillation of said pipe section;

applying an output signal of said motion sensor means representing said measured amplitude to measuring apparatus; and operating said measuring apparatus in response to said application of said output signal for determining the mass flow rate of said material in said pipe section.

18. A Coriolis flowmeter for measuring the mass flow rate of material flowing in a pipe section; said flowmeter comprising:

support means clamped to first and second spaced apart locations of said pipe section to inhibit transverse motion of said pipe section;

motion sensors affixed to different locations of said pipe section intermediate said first and second locations for detecting transverse deflections of said pipe section;

driver means affixed to said pipe section intermediate said first and second locations;

said motion sensors and said driver means being clamped directly onto said pipe section and being free from attachment to a non-movable object;

means for operating said driver means to oscillate said pipe section at a harmonic of the natural frequency of vibration of said pipe section; and said motion sensors being responsive to transverse deflections of said pipe section resulting jointly from the Coriolis motion of said pipe section due to said material flow and said oscillation of said pipe section caused by said driver means to generate output signals indicative of said deflections;

means for applying said output signals of said motion sensors to measuring apparatus; and said measuring apparatus being responsive to the said application of said output signals for determining the mass flow rate of said material in said pipe section.

19. The flowmeter of claim 18 wherein said output signals of said at least two motion sensors are phase displaced from each other by an amount dependent upon the magnitude of said material flow; and wherein said measuring apparatus determines said mass flow rate of said material based upon said phase displacement between said output signals.

20. The flowmeter of claim 18 wherein said means for oscillating said pipe section include a magnetostrictive driver for oscillating said pipe section at said harmonic frequency.

21. The flowmeter of claim 18 wherein said driver means further comprises means for sensing the frequency of oscillation of said pipe section to maintain said oscillation at a harmonic of said natural frequency of oscillation of said pipe section.

22. The flowmeter of claim 18 wherein said driver means further comprises:

a coil;

means for periodically connecting said coil a pulse generator for energizing said coil with a drive signal to oscillate said pipe section;

means for periodically disconnecting said coil from said pulse generator and for connecting said coil to a signal control circuit;

means including said signal control circuit responsive to said connection to said coil for generating a control signal; and means for applying said control signal to said pulse generator for maintaining said oscillation of said pipe section at said natural frequency of oscillation of said pipe section.

23. The flowmeter of claim 18 wherein said motion sensor means comprises an accelerometer.

24. The flowmeter of claim 18 wherein said flowmeter further comprises counterweight means affixed to said pipe section to balance forces on said pipe section resulting from said oscillation caused by said driver means.

25. A Coriolis flowmeter for determining the mass flow rate of material flowing through a pipe section, said flowmeter comprising:

support means attached to first and second spaced apart location of said pipe section to inhibit transverse motion of said pipe section;

a first motion sensor affixed to said pipe section at a third location between said first and second locations, said third location comprising a zero flow vibration node for a harmonic of the natural frequency of vibration of said pipe section;

a vibration driver affixed to said pipe section at a fourth location between said third location and said first location, said fourth location not being a vibration node of said pipe section at said harmonic frequency;

said motion sensor and said driver being attached only to said pipe section and being free from attachment to a non-movable object;

means for operating said driver to oscillate said pipe section at said harmonic frequency; and means for determining the mass flow rate of said material through said pipe section by measuring with said motion sensor the amplitude of the transverse deflections of said third location of said pipe section in a direction perpendicular to the longitudinal axis of said pipe section;

said transverse deflections of said third pipe section location being caused jointly by the Coriolis motion of said pipe section due to said material flow and said oscillation of said pipe section.

26. The apparatus of claim 25 wherein said means for determining comprises:

means for receiving an output signal from said motion sensor representing said measured amplitude to measuring apparatus; and means responsive to said reception of said output signal for operating said measuring apparatus for determining the mass flow rate of said material in said pipe section in said pipe section.

27. A method of determining information including the mass flow rate of material flowing through a pipe section which is an integral part of an existing pipe system, said method comprising the steps of:

affixing a motion sensor to a said pipe section;

affixing a vibration driver to said pipe section;

said motion sensor and said vibration driver being attached only to said pipe section and being devoid of attachment to a non-movable object;

said vibration driver comprising a magnetostrictive transducer for oscillating said pipe section;

applying a drive current to said magnetostrictive transducer to oscillate said pipe section by forcing a magnetostrictive element in said transducer to elongate and return to normal length according to the frequency of said drive current;

adjusting said frequency of said drive current to operate said driver to drive said pipe section at said harmonic frequency; and determining the mass flow rate of said material flowing through said pipe section by measuring with said motion sensor the amplitude of a transverse deflection of said pipe section in a direction perpendicular to the longitudinal axis of said pipe section;

said deflections being caused jointly by said oscillations and the Coriolis motion of said pipe section due to said material flow.

28. The method of claim 27 wherein said method further comprises the steps of:

periodically stopping the application of said drive current to said magnetostrictive transducer;

measuring the electromotive force produced by the changes in length of said magnetostrictive element from the force of the oscillation of said existing pipe section to determine the frequency and amplitude of oscillation of said existing pipe section; and applying a signal resulting from said measured electromotive force to control circuitry for operating said magnetostrictive transducer at said harmonic mode of the natural frequency of vibration of said existing pipe section.

* * * * *